United States Patent [19]
Imai et al.

[11] 4,303,313
[45] Dec. 1, 1981

[54] PHOTOGRAPHIC LENS SYSTEM

[75] Inventors: Toshihiro Imai; Hiroshi Takase, both of Hachiouji, Japan

[73] Assignee: Olympus Optical Co., Ltd., Tokyo, Japan

[21] Appl. No.: 97,664

[22] Filed: Nov. 27, 1979

[30] Foreign Application Priority Data

Nov. 28, 1978 [JP] Japan ................................. 53/146001

[51] Int. Cl.$^3$ ............................................... G02B 9/34
[52] U.S. Cl. ................................................. 350/456
[58] Field of Search ............................... 350/220, 456

[56] References Cited
U.S. PATENT DOCUMENTS 2,446,402  8/1948  Aklin ............................. 350/220 X

*Primary Examiner*—Paul A. Sacher
*Attorney, Agent, or Firm*—Cushman, Darby & Cushman

[57] ABSTRACT

A photographic lens system is constituted of four lens components and four lens elements, comprising a first lens component of a meniscus positive lens with its convex surface on the object side, a second lens component of a biconcave lens, a third lens component of a biconvex lens and a fourth lens component of a meniscus negative lens with its convex on the image side. It is so arranged that the shortening of the focal length in such a manner that the image quality is kept good over a wide angle of field of view and the reducing of the telephoto ratio are well balanced so as to enable provision of a very compact photographic lens system having superior characteristics.

6 Claims, 7 Drawing Figures

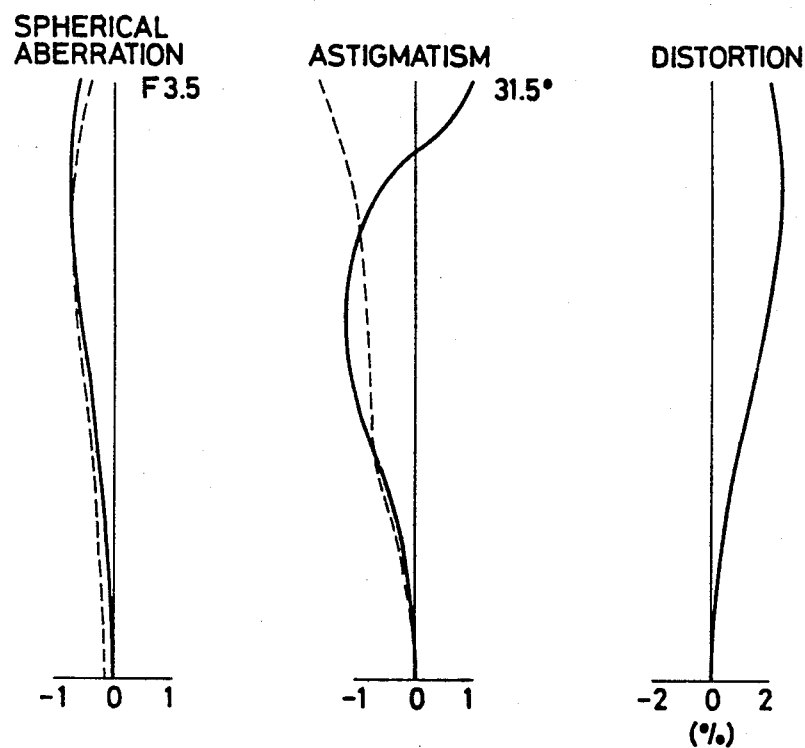

PHOTOGRAPHIC LENS SYSTEM

FIELD OF THE INVENTION

The present invention relates to a photographic lens system for use in a compact camera using 35 mm film, and more particularly to a lens system having an angle of field of view wider than 60° and F-number of 3.5 and having a small number of lens elements.

DESCRIPTION OF THE PRIOR ART

Conventionally, for the purpose of making compact a lens system such as described above, a Tessar type lens system with a rear aperture stop has been adopted. However, in a lens system of Tessar type with a rear aperture stop (as described, for example, in Japanese Published Examined Patent Application No. 19387/72), the telephoto ratio is in the order of about 1.1. A photographic lens system of this telephoto type which has been known is disclosed in Japanese Published Examined Patent Application No. 5844/68, but its angle of field of view is narrow and its aperture ratio is small.

The present invention provides a very compact photographic lens system, in which the telephoto ratio is in the order of about 1.0, the angle of field of view is wider than 60° and F-number is 3.5.

In order to shorten the total length of the lens system, there are known two methods, one is to shorten the focal length of the lens system and the other is to make the telephoto ratio (a proportion of the length from the first lens surface to the film surface and the focal length) small. In order to make the total length of the lens system markedly short as described above, it is necessary both to shorten the focal length and to make the telephoto ratio small. In order to make the telephoto ratio small, there may be adopted a telephoto type lens system in which a negative lens is arranged at a rear portion of the lens system. However, in order to shorten the focal length in such a telephoto type lens system, it is necessary to secure good lens characteristics over angle of field of view wider than 60°, which was not possible in a conventional telephoto type lens system.

SUMMARY OF THE INVENTION

According to the present invention, on the one hand, a telephoto type lens system is adopted and, on the other hand, the shortening of the focal length in a manner as to keep the image quality good over a wide angle of field of view and the reducing of the telephoto ratio are arranged to be well balanced, and this enables provision of a very compact photographic lens system having superior characteristics.

The photographic lens system according to the present invention is constituted of four lens components and four lens elements, comprising a first lens component of a meniscus positive lens with its convex surface on the object side, a second lens component of a biconcave lens, a third lens component of a biconvex lens and a fourth lens component of a meniscus negative lens with its convex surface on the image side. This lens system satisfies the following conditions:

$$1.4 < f/f_{123} < 1.8 \quad (1)$$

$$-1.4 < f/f_4 < -0.8 \quad (2)$$

$$0.05 < d_5/f < 0.13 \quad (3)$$

$$0.13 < d_6/f < 0.24 \quad (4)$$

wherein the reference symbol $f_{123}$ represents the composite focal length of the first, second and third lens components of the front lens group located in front of the aperture stop, the symbol $f_4$ represents the focal length of the fourth lens component of the rear lens group located behind the aperture stop, the symbol $d_5$ represents the axial thickness of the third lens component, the symbol $d_6$ represents the axial air space between the third and fourth lens components, that is, between the front and rear lens groups, and the symbol $f$ represents the overall focal length of the total lens system, respectively. Further objects and advantages will be apparent in the arrangements as set forth in the following specification taken together with the accompanying drawings.

DESCRIPTION OF THE DRAWINGS

FIGS. 3 through 7 show graphs illustrating conditions of aberrations of each of the embodiments of the present invention.

DESCRIPTION OF THE PREFERRED EMBODIMENTS

Figure 1:
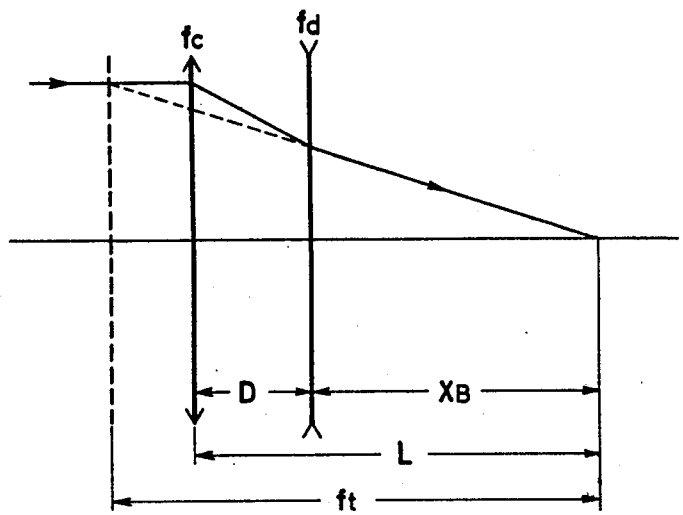
FIG. 1 shows the principle of the present invention.

In the photographic lens system according to the present invention, a telephoto type lens system is adopted with a front lens group being of a convergent lens system and a rear lens group being of a divergent lens system. As shown in FIG. 1, when a composite focal length of the front lens group is represented by $f_c$, a composite focal length of the rear lens group by $f_d$, a focal length of the total lens system by $f_t$, an interval of principal points between the front and rear lens groups by $D$, the length from the principal point of the rear lens group to the film surface by $X_B$ and the length from the principal point of the front lens group to the film surface by $L$, the telephoto ratio $R$ in the paraxial optical system can be obtained as follow:

$$L = D + X_B \quad (a)$$

$$\frac{1}{f_d} = -\frac{1}{f_c - D} + \frac{1}{X_B}$$

therefore $$\frac{1}{X_B} = \frac{1}{f_c - D} + \frac{1}{f_d} = \frac{f_d + f_c - D}{f_d(f_c - D)}$$

and $$\frac{1}{f_t} = \frac{1}{f_c} + \frac{1}{f_d} - \frac{D}{f_c \cdot f_d}$$

so that $$R = \frac{L}{f_t} = \frac{D + X_B}{f_t}$$

$$= \left[ \frac{1}{f_c} + \frac{1}{f_d} - \frac{D}{f_c \cdot f_d} \right] \left[ D + \frac{f_d(f_c - D)}{f_d + f_c - D} \right]$$

$$= \left( \frac{f_d + f_c - D}{f_c \cdot f_d} \right) D - \frac{D}{f_c} + 1$$

$$\frac{D}{f_d} \left( 1 - \frac{D}{f_c} \right) + 1$$

and $$\frac{1}{f_t} = \frac{f_d + f_c - D}{f_c \cdot f_d} \quad (b)$$

thus, $$R = \left( \frac{f_d + f_c - D}{f_c \cdot f_d} \right) D - \frac{D}{f_c} + 1$$

-continued $$= \frac{D}{f_t} - \frac{D}{f_c} + 1$$

$$= \frac{D}{f_t}\left(1 - \frac{f_t}{f_c}\right) + 1$$

The Petzval sum is a parameter which can show a curvature of field and it has been known that it can be represented by the following expression (c).

$$P = \sum_i \frac{1}{n_i f_1} \quad (c)$$

Figure 2:
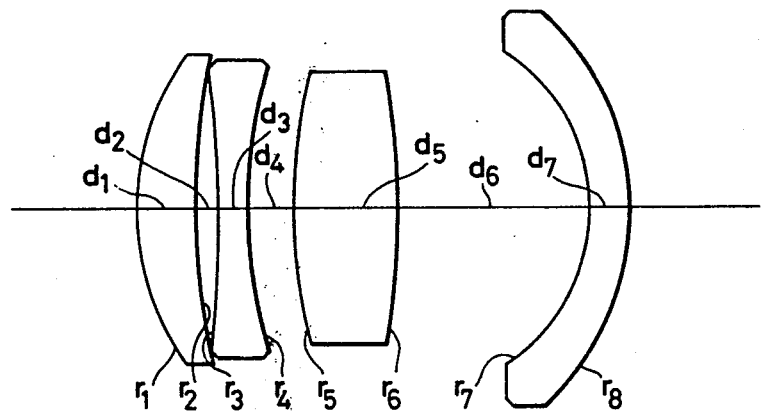
FIG. 2 shows a sectional view of the photographic lens system of the present invention.
Figure 4:
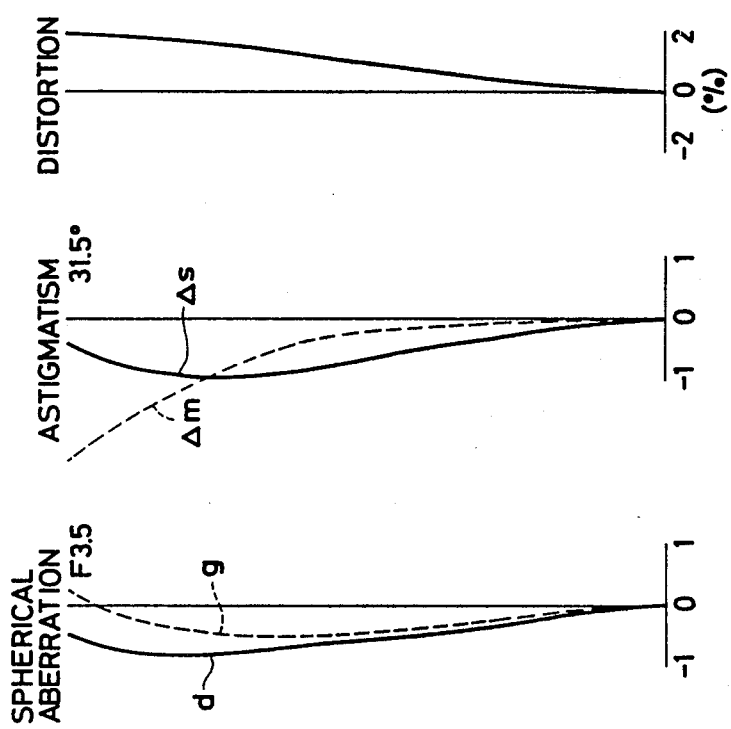
Figure 3:
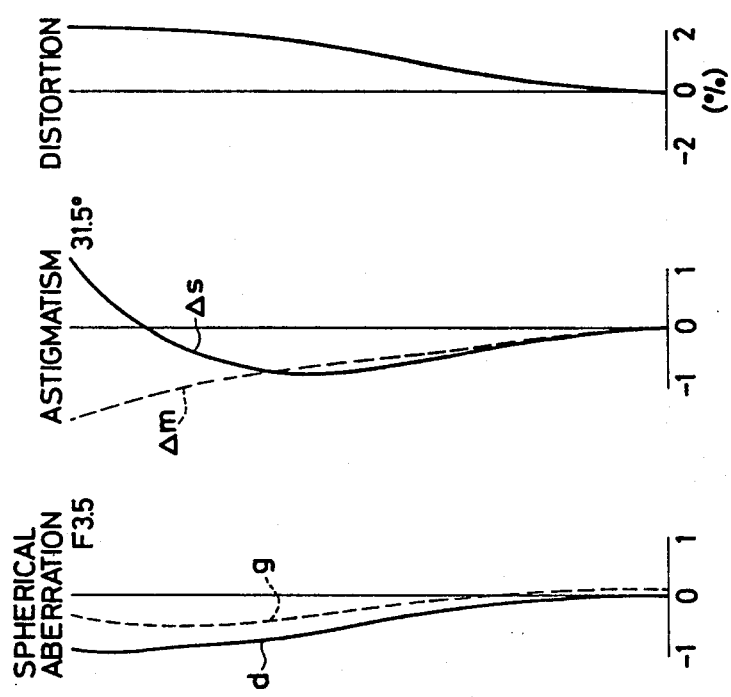
Figure 6:
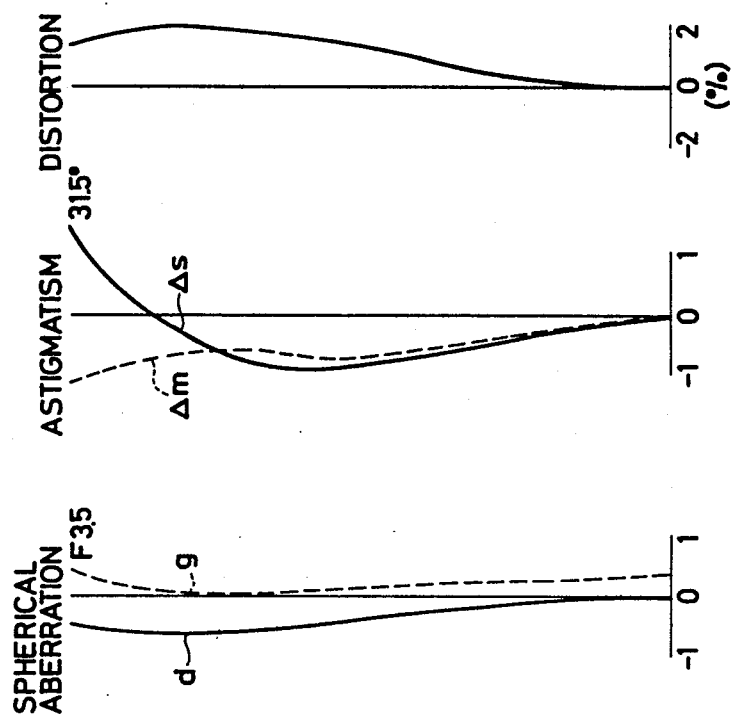
Figure 5:
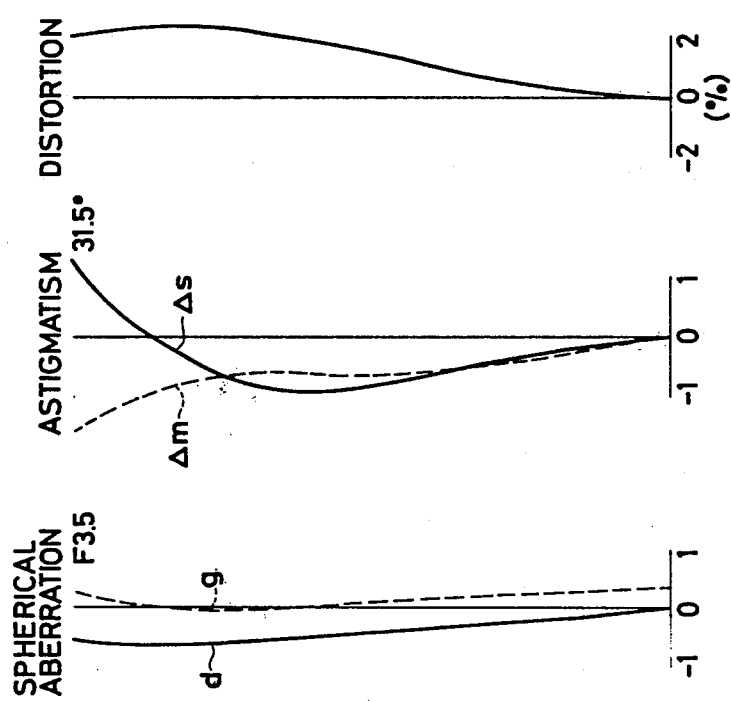

When the symbols in the above described expressions are applied to the lens system according to the present invention in FIG. 2, the symbol $f_c$ corresponds to $f_{123}$, the symbol $f_d$ corresponds to $f_4$, the symbol $f_t$ corresponds to f and the symbol D corresponds to $d_6$.

In the right portion of the expression (b) among the above expressions (a), (b) and (c), $(1-f_t/f_c)$ is a negative value so that it is necessary to make $f_t/f_c$ large in order to make the telephoto ratio R small. According to the present invention, as shown in condition (1), it is intended that the telephoto ratio be made small by making $f_t/f_c$ (that is, $f/f_{123}$) larger than 1.4. When $f/f_{123}$ is smaller than 1.4, it is impossible to make the telephoto ratio small.

The first term of the right portion in the expression (a) is in a negative value because of negative value of $f_d$, and therefore, $|1/f_d|$ may be made large in order to make the telephoto ratio small. Thus, according to the present invention, it is intended that the telephoto ratio be made small by making $f/f_4$ smaller than $-0.8$ in condition (2). That is, it is impossible to make the telephoto ratio small if $f/f_4$ is larger than $-0.8$. In the same way, the telephoto ratio becomes small when D in the expression (a) becomes large. Thus, according to the present invention, as in condition (4), $d_6/f$ is made larger than 0.13. It becomes impossible to make small the telephoto ratio if $d_6/f$ is smaller than 0.13.

In order to secure good lens characteristics over angle of field of view wider than 60° in the telephoto type lens system, it is necessary for a curvature of field and an astigmatic difference to be of small value. For the purpose of making small the curvature of field, as seen from the expression (c) it is necessary to make the focal length of the positive lens components as long as possible. Therefore, according to the present invention, $f/f_{123}$ is smaller than 1.8 as shown in condition (1). If the upper limit under this condition (1) is exceeded, the curvature of field becomes large.

Next, in order to keep an oblique beam of light symmetrical, the fourth lens component in the rear divergent lens group is formed in a tightly curved meniscus shape. However, if $f/f_4$ is made smaller than $-0.8$ in order to make the telephoto ratio small as explained above, the absolute value of the radius of curvature $|r_7|$ of the object side surface of the fourth lens component becomes small, the bulging (on graphical showing) of the axial spherical aberration becomes large and also the astigmatic difference becomes large.

Therefore, the lens characteristics on the axis is improved by making $f/f_4$ larger than $-1.4$ and, further, by making $|r_7|/f$ larger than 0.15 for the object side surface of the fourth lens component. If the lower limit under this condition (2) is exceeded, it becomes impossible to improve the lens characteristics on the axis.

Under condition (3), the astigmatic difference is intended to be made small over the whole angular field of view by making $d_5/f$ larger than 0.05. However, if $d_5$ is too large, the total length of the lens system becomes long and the quantity of light at the peripheral portion becomes insufficient. Therefore, $d_5/f$ must be made smaller than 0.13. When the lower limit under this condition (3) is exceeded, the astigmatic difference becomes large and, when the upper limit is exceeded, the total length of the lens system becomes long and the quantity of light at the peripheral portion becomes insufficient.

As described above, when the axial air space between the front and rear lens groups $d_6$ is increased for the purpose of making the telephoto ratio small and, as a result, the upper limit under condition (4) is exceeded, the diameter of the fourth lens component becomes excessively large and its thickness becomes great, which is undesirable. When $d_6/f$ is larger than 0.24, astigmatism becomes large.

Now, some preferred embodiments of the present invention relating to the photographic lens system as described above are given below:

| Embodiment 1 | | | |
|---|---|---|---|
| $r_1 = 28.05$ | | | |
| | $d_1 = 9.12$ | $n_1 = 1.72$ | $v_1 = 50.25$ |
| $r_2 = 77.488$ | | | |
| | $d_2 = 2.65$ | | |
| $r_3 = -147.238$ | | | |
| | $d_3 = 2.94$ | $n_2 = 1.78472$ | $v_2 = 25.71$ |
| $r_4 = 45.879$ | | | |
| | $d_4 = 5.57$ | | |
| $r_5 = 58.624$ | | | |
| | $d_5 = 10.56$ | $n_3 = 1.70154$ | $v_3 = 41.10$ |
| $r_6 = -77.882$ | | | |
| | $d_6 = 16.49$ | | |
| $r_7 = -20.018$ | | | |
| | $d_7 = 3.82$ | $n_4 = 1.78590$ | $v_4 = 44.18$ |
| $r_8 = -29.550$ | | | |
| $f = 100$ | | | |
| $f/f_{123} = 1.590$ | | | |
| $f/f_4 = -1.043$ | | | |
| $d_5/f = 0.106$ | | | |
| $d_6/f = 0.165$ | | | |
| $|r_7|/f = 0.2$ | | | |

| Embodiment 2 | | | |
|---|---|---|---|
| $r_1 = 26.309$ | | | |
| | $d_1 = 5.97$ | $n_1 = 1.72$ | $v_1 = 46.03$ |
| $r_2 = 67.844$ | | | |
| | $d_2 = 1.91$ | | |
| $r_3 = -146.694$ | | | |
| | $d_3 = 2.94$ | $n_2 = 1.78472$ | $v_2 = 25.71$ |
| $r_4 = 46.450$ | | | |
| | $d_4 = 4.71$ | | |
| $r_5 = 59.753$ | | | |
| | $d_5 = 10.38$ | $n_3 = 1.70154$ | $v_3 = 41.1$ |
| $r_6 = -77.156$ | | | |
| | $d_6 = 18.76$ | | |
| $r_7 = -18.674$ | | | |
| | $d_7 = 3.82$ | $n_4 = 1.78590$ | $v_4 = 44.18$ |
| $r_8 = -26.841$ | | | |
| $f = 100$ | | | |
| $f/f_{123} = 1.61$ | | | |
| $f/f_4 = -1.017$ | | | |
| $d_5/f = 0.104$ | | | |
| $d_6/f = 0.188$ | | | |
| $|r_7|/f = 0.187$ | | | |

| Embodiment 3 | | | |
|---|---|---|---|
| $r_1 = 29.696$ | | | |
| | $d_1 = 9.41$ | $n_1 = 1.6935$ | $v_1 = 53.23$ |
| $r_2 = 80.265$ | | | |
| | $d_2 = 3.22$ | | |
| $r_3 = -135.051$ | | | |
| | $d_3 = 2.95$ | $n_2 = 1.78472$ | $v_2 = 25.71$ |
| $r_4 = 73.938$ | | | |
| | $d_4 = 8.58$ | | |
| $r_5 = 56.077$ | | | |
| | $d_5 = 7.39$ | $n_3 = 1.62280$ | $v_3 = 57.06$ |
| $r_6 = -88.905$ | | | |
| | $d_6 = 17.02$ | | |
| $r_7 = -19.867$ | | | |
| | $d_7 = 4.09$ | $n_4 = 1.691$ | $v_4 = 54.84$ |
| $r_8 = -33.215$ | | | |
| $f = 100$ | | | |
| $f/f_{123} = 1.63$ | | | |
| $f/f_4 = -1.222$ | | | |
| $d_5/f = 0.074$ | | | |
| $d_6/f = 0.170$ | | | |
| $|r_7|/f = 0.199$ | | | |

| Embodiment 4 | | | |
|---|---|---|---|
| $r_1 = 28.975$ | | | |
| | $d_1 = 9.66$ | $n_1 = 1.69100$ | $v_1 = 54.84$ |
| $r_2 = 80.927$ | | | |
| | $d_2 = 3.07$ | | |
| $r_3 = -132.851$ | | | |
| | $d_3 = 2.96$ | $n_2 = 1.74077$ | $v_2 = 27.79$ |
| $r_4 = 58.815$ | | | |
| | $d_4 = 8.03$ | | |
| $r_5 = 54.074$ | | | |
| | $d_5 = 7.68$ | $n_3 = 1.60311$ | $v_3 = 60.70$ |
| $r_6 = -79.364$ | | | |
| | $d_6 = 16.01$ | | |
| $r_7 = -19.696$ | | | |
| | $d_7 = 3.24$ | $n_4 = 1.69100$ | $v_4 = 54.84$ |
| $r_8 = -31.503$ | | | |
| $f = 100$ | | | |
| $f/f_{123} = 1.61$ | | | |
| $f/f_4 = -1.167$ | | | |
| $d_5/f = 0.077$ | | | |
| $d_6/f = 0.160$ | | | |
| $|r_7|/f = 0.197$ | | | |

| Embodiment 5 | | | |
|---|---|---|---|
| $r_1 = 28.109$ | | | |
| | $d_1 = 10.29$ | $n_1 = 1.691$ | $v_1 = 54.84$ |
| $r_2 = 92.061$ | | | |
| | $d_2 = 2.35$ | | |
| $r_3 = -196.173$ | | | |
| | $d_3 = 2.94$ | $n_2 = 1.78472$ | $v_2 = 25.71$ |
| $r_4 = 52.777$ | | | |
| | $d_4 = 7.59$ | | |
| $r_5 = 60.411$ | | | |
| | $d_5 = 8.54$ | $n_3 = 1.60342$ | $v_3 = 38.01$ |
| $r_6 = -80.771$ | | | |
| | $d_6 = 14.07$ | | |
| $r_7 = -19.490$ | | | |
| | $d_7 = 4.53$ | $n_4 = 1.744$ | $v_4 = 44.73$ |
| $r_8 = -29.810$ | | | |
| $f = 100$ | | | |
| $f/f_{123} = 1.613$ | | | |
| $f/f_4 = -1.074$ | | | |
| $d_5/f = 0.085$ | | | |
| $d_6/f = 0.141$ | | | |
| $|r_7|/f = 0.195$ | | | | wherein the reference symbols $r_1$ through $r_8$ represent radii of curvature of the respective lens surfaces, the symbols $d_1$ through $d_7$ represent the axial thicknesses of the respective lenses and axial air spaces between the lenses, the symbols $n_1$ through $n_4$ represent the refractive indices of the respective lenses and the symbols $v_1$ through $v_4$ represent the Abbe numbers of the respective lenses, respectively.

We claim:

1. A photographic lens system comprising a first lens component of a meniscus positive lens with its convex surface on the object side, a second lens component of a biconcave lens, a third lens component of a biconvex lens and a fourth lens component of a meniscus negative lens with its convex surface on the image side, the said lens system satisfying the following conditions:

$$1.5 < f/f_{123} < 1.7 \tag{1}$$

$$-1.3 < f/f_4 < -1.0 \tag{2}$$

$$0.07 < d_5 f < 0.11 \tag{3}$$

$$0.14 < d_6/f < 0.19 \tag{4}$$

wherein the reference symbol f represents the focal length of the total lens system, the symbol $f_{123}$ represents the composite focal length of the first, second and third lens components, the symbol $f_4$ represents the focal length of the fourth lens component, the symbol $d_5$ represents the axial thickness of the third lens component and the symbol $d_6$ represents the axial air space between the third and fourth lens components, respectively.

2. A photographic lens system according to claim 1, having the following data:

| $r_1 = 28.05$ | | | |
|---|---|---|---|
| | $d_1 = 9.12$ | $n_1 = 1.72$ | $v_1 = 50.25$ |
| $r_2 = 77.488$ | | | |
| | $d_2 = 2.65$ | | |
| $r_3 = -147.238$ | | | |
| | $d_3 = 2.94$ | $n_2 = 1.78472$ | $v_2 = 25.71$ |
| $r_4 = 45.879$ | | | |
| | $d_4 = 5.57$ | | |
| $r_5 = 58.624$ | | | |
| | $d_5 = 10.56$ | $n_3 = 1.70154$ | $v_3 = 41.10$ |
| $r_6 = -77.882$ | | | |
| | $d_6 = 16.49$ | | |
| $r_7 = -20.018$ | | | |
| | $d_7 = 3.82$ | $n_4 = 1.78590$ | $v_4 = 44.18$ |
| $r_8 = -29.550$ | | | |
| $f = 100$ | | | |
| $f/f_{123} = 1.590$ | | | |
| $f/f_4 = -1.043$ | | | |
| $d_5/f = 0.106$ | | | |
| $d_6/f = 0.165$ | | | |
| $|r_7|/f = 0.2$ | | | | wherein the reference symbols $r_1$ through $r_8$ represent radii of curvature of the respective lens surfaces, the symbols $d_1$ through $d_7$ represent the axial thicknesses of the respective lenses and axial air spaces between the lenses, the symbols $n_1$ through $n_4$ represent the refractive indices of the respective lenses, the symbols $v_1$ through $v_4$ represent the Abbe numbers of the respective lenses, the symbol f represents the focal length of the total lens system, the symbol $f_{123}$ represents the composite focal length of the first, second and third lens components and the symbol $f_4$ represents the focal length of the fourth lens component, respectively.

3. A photographic lens system according to claim 1, having the following data:

| $r_1 = 26.309$ |
|---|

-continued

| | | | |
|---|---|---|---|
| $d_1 = 5.97$ | $n_1 = 1.72$ | $\nu_1 = 46.03$ | |
| $r_2 = 67.844$ | | | |
| $d_2 = 1.91$ | | | |
| $r_3 = -146.694$ | | | |
| $d_3 = 2.94$ | $n_2 = 1.78472$ | $\nu_2 = 25.71$ | |
| $r_4 = 46.450$ | | | |
| $d_4 = 4.71$ | | | |
| $r_5 = 59.753$ | | | |
| $d_5 = 10.38$ | $n_3 = 1.70154$ | $\nu_3 = 41.1$ | |
| $r_6 = -77.156$ | | | |
| $d_6 = 18.76$ | | | |
| $r_7 = -18.674$ | | | |
| $d_7 = 3.82$ | $n_4 = 1.78590$ | $\nu_4 = 44.18$ | |
| $r_8 = -26.841$ | | | |
| $f = 100$ | | | |
| $f/f_{123} = 1.61$ | | | |
| $f/f_4 = -1.017$ | | | |
| $d_5/f = 0.104$ | | | |
| $d_6/f = 0.188$ | | | |
| $|r_7|/f = 0.187$ | | | | wherein the reference symbols $r_1$ through $r_8$ represent radii of curvature of the respective lens surfaces, the symbols $d_1$ through $d_7$ represent the axial thicknesses of the respective lenses and axial air spaces between the lenses, the symbols $n_1$ through $n_4$ represent the refractive indices of the respective lenses, the symbols $\nu_1$ through $\nu_4$ represent the Abbe numbers of the respective lenses, the symbol f represents the focal length of the total lens system, the symbol $f_{123}$ represents the composite focal length of the first, second and third lens components and the symbol $f_4$ represents the focal length of the fourth lens component, respectively.

4. A photographic lens system according to claim 1, having the following data:

| | | | |
|---|---|---|---|
| $r_1 = 29.696$ | | | |
| $d_1 = 9.41$ | $n_1 = 1.6935$ | $\nu_1 = 53.23$ | |
| $r_2 = 80.265$ | | | |
| $d_2 = 3.22$ | | | |
| $r_3 = -135.051$ | | | |
| $d_3 = 2.95$ | $n_2 = 1.78472$ | $\nu_2 = 25.71$ | |
| $r_4 = 73.938$ | | | |
| $d_4 = 8.58$ | | | |
| $r_5 = 56.077$ | | | |
| $d_5 = 7.39$ | $n_3 = 1.62280$ | $\nu_3 = 57.06$ | |
| $r_6 = -88.905$ | | | |
| $d_6 = 17.02$ | | | |
| $r_7 = -19.867$ | | | |
| $d_7 = 4.09$ | $n_4 = 1.691$ | $\nu_4 = 54.84$ | |
| $r_8 = -33.215$ | | | |
| $f = 100$ | | | |
| $f/f_{123} = 1.63$ | | | |
| $f/f_4 = -1.222$ | | | |
| $d_5/f = 0.074$ | | | |
| $d_6/f = 0.170$ | | | |
| $|r_7|/f = 0.199$ | | | | wherein the reference symbols $r_1$ through $r_8$ represent radii of curvature of the respective lens surfaces, the symbols $d_1$ through $d_7$ represent the axial thicknesses of the respective lenses and axial air spaces between the lenses, the symbols $n_1$ through $n_4$ represent the refractive indices of the respective lenses, the symbols $\nu_1$ through $\nu_4$ represent the Abbe numbers of the respective lenses, the symbol f represents the focal length of the total lens system, the symbol $f_{123}$ represents the composite focal length of the first, second and third lens components and the symbol $f_4$ represents the focal length of the fourth lens component, respectively.

5. A photographic lens system according to claim 1, having the following data:

| | | | |
|---|---|---|---|
| $r_1 = 28.975.$ | | | |
| $d_1 = 9.66$ | $n_1 = 1.69100$ | $\nu_1 = 54.84$ | |
| $r_2 = 80.927$ | | | |
| $d_2 = 3.07$ | | | |
| $r_3 = -132.851$ | | | |
| $d_3 = 2.96$ | $n_2 = 1.74077$ | $\nu_2 = 27.79$ | |
| $r_4 = 58.815$ | | | |
| $d_4 = 8.03$ | | | |
| $r_5 = 54.074$ | | | |
| $d_5 = 7.68$ | $n_3 = 1.60311$ | $\nu_3 = 60.70$ | |
| $r_6 = -79.364$ | | | |
| $d_6 = 16.01$ | | | |
| $r_7 = -19.696$ | | | |
| $d_7 = 3.24$ | $n_4 = 1.69100$ | $\nu_4 = 54.84$ | |
| $r_8 = -31.503$ | | | |
| $f = 100$ | | | |
| $f/f_{123} = 1.61$ | | | |
| $f/f_4 = -1.167$ | | | |
| $d_5/f = 0.077$ | | | |
| $d_6/f = 0.160$ | | | |
| $|r_7|/f = 0.197$ | | | | wherein the reference symbols $r_1$ through $r_8$ represent radii of curvature of the respective lens surfaces, the symbols $d_1$ through $d_7$ represent the axial thicknesses of the respective lenses and axial air spaces between the lenses, the symbols $n_1$ through $n_4$ represent the refractive indices of the respective lenses, the symbols $\nu_1$ through $\nu_4$ represent the Abbe numbers of the respective lenses, the symbol f represents the focal length of the total lens system, the symbol $f_{123}$ represents the composite focal length of the first, second and third lens components and the symbol $f_4$ represents the focal length of the fourth lens component, respectively.

6. A photographic lens system according to claim 1, having the following data:

| | | | |
|---|---|---|---|
| $r_1 = 28.109$ | | | |
| $d_1 = 10.29$ | $n_1 = 1.691$ | $\nu_1 = 54.84$ | |
| $r_2 = 92.061$ | | | |
| $d_2 = 2.35$ | | | |
| $r_3 = -196.173$ | | | |
| $d_3 = 2.94$ | $n_2 = 1.78472$ | $\nu_2 = 25.71$ | |
| $r_4 = 52.777$ | | | |
| $d_4 = 7.59$ | | | |
| $r_5 = 60.411$ | | | |
| $d_5 = 8.54$ | $n_3 = 1.60342$ | $\nu_3 = 38.01$ | |
| $r_6 = -80.771$ | | | |
| $d_6 = 14.07$ | | | |
| $r_7 = -19.490$ | | | |
| $d_7 = 4.53$ | $n_4 = 1.744$ | $\nu_4 = 44.73$ | |
| $r_8 = -29.810$ | | | |
| $f = 100$ | | | |
| $f/f_{123} = 1.613$ | | | |
| $f/f_4 = -1.074$ | | | |
| $d_5/f = 0.085$ | | | |
| $d_6/f = 0.141$ | | | |
| $|r_7|/f = 0.195$ | | | | wherein the reference symbols $r_1$ through $r_8$ represent radii of curvature of the respective lens surfaces, the symbols $d_1$ through $d_7$ represent the axial thicknesses of the respective lenses and axial air spaces between the lenses, the symbols $n_1$ through $n_4$ represent the refractive indices of the respective lenses, the symbols $\nu_1$ through $\nu_4$ represent the Abbe numbers of the respective lenses, the symbol f represents the focal length of the total lens system, the symbol $f_{123}$ represents the composite focal length of the first, second and third lens components and the symbol $f_4$ represents the focal length of the fourth lens component, respectively.

* * * * *